(12) United States Patent
Deibler (10) Patent No.: US 9,734,534 B2
(45) Date of Patent: Aug. 15, 2017

(54) COMPUTERIZED SYSTEM FOR REPORTING AND ENCOURAGING REPORTING OF INCOME/TIPS BY SOLE PROPRIETORS, INDEPENDENT CONTRACTORS AND EMPLOYING OF CASH BASED BUSINESSES AND METHOD THEREOF

(75) Inventor: Alina Deibler, Scottsdale, AZ (US)

(73) Assignee: Alina P Deibler EA, PLLC, Phoenix, AZ (US)

( * ) Notice: Subject to any disclaimer, the term of this patent is extended or adjusted under 35 U.S.C. 154(b) by 1338 days.

(21) Appl. No.: 11/692,110

(22) Filed: Mar. 27, 2007

(65) Prior Publication Data
US 2007/0244774 A1 Oct. 18, 2007

Related U.S. Application Data

(63) Continuation-in-part of application No. 11/300,063, filed on Dec. 14, 2005, now abandoned.

(51) Int. Cl.
*G06Q 40/02* (2012.01)
*G06Q 40/00* (2012.01)
*G07F 19/00* (2006.01)

(52) U.S. Cl.
CPC ............ *G06Q 40/02* (2013.01); *G06Q 40/12* (2013.12); *G07F 19/00* (2013.01)

(58) Field of Classification Search
CPC .................................................... G06Q 40/10
USPC .......................................................... 705/35
See application file for complete search history.

(56) References Cited

U.S. PATENT DOCUMENTS

| | | | |
|---|---|---|---|
| 5,121,097 A * | 6/1992 | van Zeggeren | 340/434 |
| 5,335,169 A | 8/1994 | Chong | |
| 5,623,403 A * | 4/1997 | Highbloom | 705/28 |
| 5,644,724 A * | 7/1997 | Cretzler | 705/19 |
| 5,774,872 A * | 6/1998 | Golden et al. | 705/19 |
| 5,799,283 A | 8/1998 | Francisco et al. | |
| 5,869,825 A * | 2/1999 | Ziarno | 235/380 |
| 5,875,433 A * | 2/1999 | Francisco et al. | 705/26 |
| 5,991,736 A * | 11/1999 | Ferguson et al. | 705/14 |
| 6,039,688 A | 3/2000 | Douglas et al. | |
| 6,098,048 A * | 8/2000 | Dashefsky et al. | 705/7.32 |
| 6,112,188 A | 8/2000 | Hartnett | |
| 6,122,591 A * | 9/2000 | Pomerantz | 701/201 |
| 6,125,988 A | 10/2000 | Waters | |
| 6,601,033 B1 | 7/2003 | Sowinski | |
| 6,845,364 B1 | 1/2005 | Pool et al. | |

(Continued)

OTHER PUBLICATIONS

IRS Website as of Jan. 5, 2007, EFTPS sheet, Topic 252 Electronic filing, Form 8825(2006) Form F1040SC.*

(Continued)

*Primary Examiner* — Bruce I Ebersman
(74) *Attorney, Agent, or Firm* — David E Herron II (57) ABSTRACT

A method for reporting cash transactions comprises: registering with the federal and local government as a cashed based business; reporting of cash transaction by the cash based business at designated time frames; offering benefits by the federal and local government to the cash based business for accurate reporting of cash transactions; and accessing a penalty to the cashed based business if reporting of cash transactions by the cash based business is not done by the designated time frame.

9 Claims, 6 Drawing Sheets

(56) References Cited

U.S. PATENT DOCUMENTS

| | | | |
|---|---|---|---|
| 6,889,200 B2* | 5/2005 | Agee et al. | 705/19 |
| 6,961,714 B1 | 11/2005 | LeVine | |
| 6,988,034 B1* | 1/2006 | Marlatt et al. | 701/200 |
| 6,993,502 B1 | 1/2006 | Gryglewicz | |
| 7,043,448 B2 | 5/2006 | Campbell | |
| 7,188,083 B2* | 3/2007 | Agee et al. | 705/31 |
| 7,194,426 B1 | 3/2007 | Box | |
| 7,200,569 B2 | 4/2007 | Gallagher et al. | |
| 7,257,553 B1* | 8/2007 | Baker | 705/31 |
| 7,313,538 B2 | 12/2007 | Wilmes et al. | |
| 7,343,306 B1* | 3/2008 | Bates et al. | 705/4 |
| 2002/0059075 A1* | 5/2002 | Schick et al. | 705/1 |
| 2002/0107833 A1* | 8/2002 | Kerkinni | 707/1 |
| 2002/0138306 A1 | 9/2002 | Sabovich | |
| 2003/0182171 A1 | 9/2003 | Vianello | |
| 2003/0221118 A1 | 11/2003 | Walker | |
| 2003/0233278 A1 | 12/2003 | Marshall | |
| 2004/0049424 A1* | 3/2004 | Murray et al. | 705/14 |
| 2004/0073480 A1* | 4/2004 | Nahmias | 705/14 |
| 2004/0083145 A1 | 4/2004 | Kobayashi et al. | |
| 2005/0234742 A1 | 10/2005 | Hodgdon | |
| 2005/0234773 A1* | 10/2005 | Hirst et al. | 705/14 |
| 2005/0267774 A1* | 12/2005 | Merritt et al. | 705/1 |
| 2005/0280555 A1* | 12/2005 | Warner, IV | 340/932.2 |
| 2006/0085305 A1 | 4/2006 | Sindambiwe | |
| 2006/0235776 A1* | 10/2006 | Temme | 705/31 |
| 2007/0045405 A1 | 3/2007 | Rothschild | |
| 2007/0050193 A1* | 3/2007 | Larson | 705/1 |
| 2007/0095901 A1 | 5/2007 | Illingworth | |
| 2008/0235138 A1* | 9/2008 | Yokota et al. | 705/52 |

OTHER PUBLICATIONS

"The IRS Endorses 401k like Tip-reporting Incentive, Turnover cut sharpley in test", Alan Liddle, Nation's Restaurant News, NY May 29, 2000, vol. 34, iss. 22, p. 1, 2 pages. (Hereafter "The IRS Endorses").*

IRS endorses 401(k) like tip reporting incentive; turnover cut shaply in test, Allan Liddle Nations restaurant news, New York, May 29, 2000, vol. 34, iss. 22, p. 1, 2 pages.*

Flexible compensation and Cafeteria Plans, Charles Mckenzie Esq. 14 page pdf http://web.archive.org/web/20040202045651/http://www.mckenzielaw.com/cafe.htm.

IRS Website—Form 8027, IRS Offers Penalty Refund for EETPS Enrollment IR-2004-70 May 24, 2004.

Understanding Effective Salary—The Board of Pensions of the Presbyterian Church, USA 2004.

Social Security Administration pub-05-10022, Jan. 2000, http://web.archive.org/web/20000408190152/http://www.ssa.gov/pubs/10022.html ("Social Security").

IRS form 8027, 2004, Internal Revenue Service.

Community Housing Report 2004, Submitted to the Board of Selectmen by the Town Manager and the . . . , Feb. 2004,Town of Provincetown, Massachusettes, www.provincetown-ma.gov.

* cited by examiner

COMPUTERIZED SYSTEM FOR REPORTING AND ENCOURAGING REPORTING OF INCOME/TIPS BY SOLE PROPRIETORS, INDEPENDENT CONTRACTORS AND EMPLOYING OF CASH BASED BUSINESSES AND METHOD THEREOF

RELATED APPLICATIONS

The present application is a Continuation-In-Part of U.S. Patent Application entitled, "A METHOD FOR ENCOURAGING REPORTING OF INCOME/TIPS BY SOLE PROPRIETORS AND EMPLOYEES OF CASH BASED BUSINESSES", having Ser. No. 11/300,063, and a filing date of Dec. 14, 2005 now abandoned in the name of the same inventors and incorporated by reference into the present application.

FIELD OF THE INVENTION

This invention relates to tax reporting and, more specifically, to a method that encourages the reporting of income/tips by sole proprietors and employees of cash based businesses.

BACKGROUND OF THE INVENTION

Presently, there are a multitude of occupations in which workers can earn up to $50,000 or more annually but pay very low taxes. These types of occupations are generally in "cash businesses". Cash businesses are those in which only cash is accepted as payment or is generally accepted as payment for goods and/or services. Some examples of cash businesses include, but are not limited to: restaurants, bars, taxi services, cleaning and maintenance services, landscaping, construction/handyman, and the like.

In many cash businesses, there is a widespread practice of underreporting your tips or income. The IRS can use a "reasonable estimate" of tips received by employees to calculate a restaurant's share of FICA taxes, per the Supreme Court's 2002 decision on US vs. Fior D'Italia. The IRS's interest in unearthing these tax liabilities is clear. Billions of dollars in tips go unreported each year. The 7.65 percent employer tax (6.2% social security and 1.45% medicare withholding tax) on those billions is a large amount of money that the IRS is unable to collect.

Presently, cash businesses like restaurants allow waiters and other tipped employees to report gratuities monthly. But restaurants run the risk of having the IRS forcibly estimate waiters' cash tips based on the credit-card tipping rates. Waiters may feel compelled to report more tips, so that their own tax returns don't conflict with their employers'. Alternatively, restaurants can institute a more rigorous system of tip reporting, and perhaps enter into an agreement with the IRS that will reduce the likelihood the establishment will be audited.

Restaurants in some states have signed tip agreements with the IRS. These include, for example, eateries belonging to the Illinois and Nevada affiliates of the National Restaurant Association, a trade group in Washington, D.C. In Illinois, for example, the staff at the end of the night gets a printout of all their checks and the employees have to write in a tip for each printout. The IRS may question the restaurant if reported tips amount to only 5 percent or 10 percent of total receipts. So the restaurants, in turn, hold their waiters' feet to the fire and create a paper trail to back up the calculation of employer-side FICA tax. In Nevada, casinos have had tip rate determination agreements with the IRS for many years. In these agreements, the establishments accept IRS estimates of tips, and in exchange, the IRS says it won't audit the establishments or their workers.

While the above methods help to encourage accurate tax reporting on tips and/or income from sole proprietors and employees of cash businesses, billions of dollars still go unreported each year. Presently, there is not a system in, place that encourages sole proprietors and employees of cash businesses to accurately report their tips/income.

Therefore, a need exists to provide a method to overcome the above problem. The tax reporting method would encourage sole proprietors and employees of cash businesses to accurately report their tips/income.

SUMMARY OF THE INVENTION

A method for reporting cash transactions is disclosed. The method comprises: registering with the federal and local government as a cashed based business; reporting of cash transactions by the cash based business at designated time frames; offering benefits by the federal and local government to the cash based business for accurate reporting of cash transactions; and assessing a penalty to the cashed based business if reporting of cash transactions by the cash based business is not done by the designated time frame.

The present invention is best understood by reference to the following detailed description when read in conjunction with the accompanying drawings.

DETAILED DESCRIPTION

Figure 1:
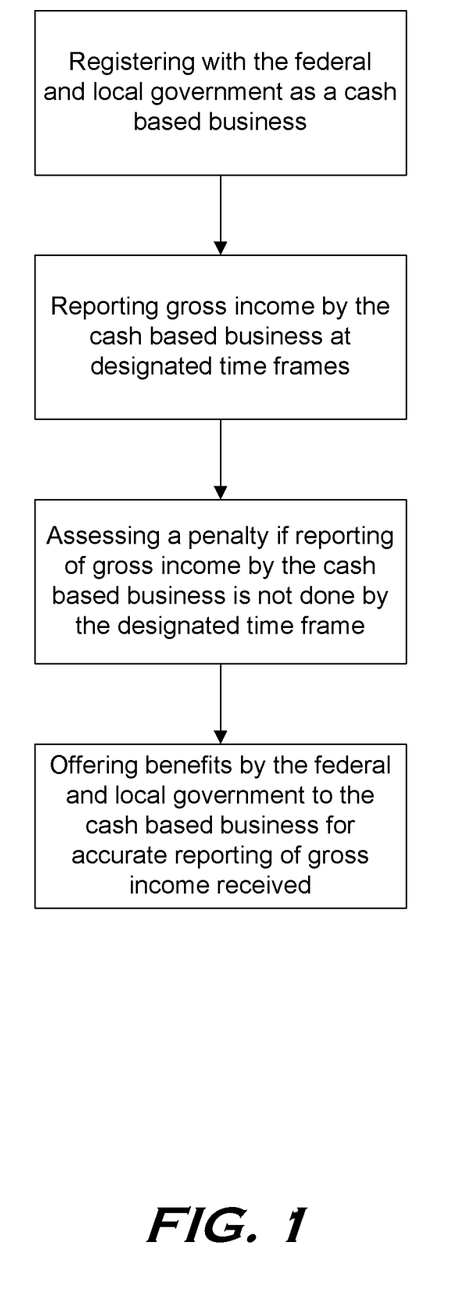
FIG. 1 is a flowchart depicting a method that encourages the reporting of income/tips by an individual cash based business.

Referring to FIG. 1, a method that encourages the reporting of income/tips by employees of cash based businesses will be disclosed. The method disclosed in FIG. 1 relates to individual cash based businesses. The method would apply to individual cash based businesses such as a landscaper, handyman, a cleaning and maintenance individual, and the like. The listing is given as an example, and should not be seen as to limit the scope of the present invention.

All individual cash based businesses would have to register as a small business. This includes registering with the Internal Revenue Service (IRS), the state and the local city as a small business with a trademark name and an Employer Identification Number (EIN) (also known as a federal tax identification number and used to identify the business entity) that allows the individual cash based businesses to do business in a specified location. Any individual cash based businesses that does not register and have an EIN or active registration will not be permitted to operate.

Once an individual cash based business is registered, the individual cash based business must report its gross income for the month to the IRS, state and local governments. The IRS or federal government will supply each registered individual cash based business with a uniform income statement form. Each month, or other designated time frame, the individual cash based business must fill in the income statement form and return it to the IRS by a designated time frame. For example, the income statement must be received by the 20$^{th}$ of each month to report the gross income for the previous month. If the income statement form is not received by a designated time frame, the IRS may assess a penalty or interest to the taxes that have to be paid. Current auditing methods may be used by the IRS to check for accuracy in the reporting of income by the registered individual cash based businesses. Alternatively, the IRS may require more detailed records to be submitted with each income statement in order to ensure accuracy in the reporting. A summary of the reported income, a gross income 1099MISC form, may be sent out to the taxpayer by the IRS at the beginning of the year so that accuracy of the reported income may be verified.

Current auditing methods may be used by the IRS to check for accuracy in the reporting of income by the registered individual cash based businesses. Alternatively, the IRS may require more detailed records to be submitted with each income statement in order to ensure accuracy in the reporting. A summary of the reported income, a gross income 1099MISC form may be sent out to the taxpayer by the IRS at the beginning of the year so that accuracy of the reported income may be verified.

In order to encourage reporting of gross income from the registered individual cash based business, the federal and local government will provide certain benefits to the registered individual cash based business. The benefits provided must be sufficient enough so that the registered individual cash based business will want to report its gross income in order to receive the benefits. At the same time, the penalty or interest assessed needs to be stiff enough so that the registered individual cash based business will want to report its gross income instead of having to be assessed the penalty or interest.

The benefits provided may be set by the federal and local government. The benefits may be different for different registered individual cash based businesses. Each registered individual cash based business may be able to select which benefit it would like to receive. Alternatively, the federal and local government may only offer certain benefits to certain registered individual cash based businesses based on certain criteria.

One benefit the federal and local governments may provide is medical coverage for the individual cash based businesses. The medical coverage may be emergency medical coverage, basic medical coverage, or a more comprehensive medical package. The medical coverage may be based on different factors such as the amount of income from the individual cash based businesses, tax income generated from this program, and the like. The listing of the above are examples of different criteria and should not be seen as to limit the scope of the present invention. At a minimum, major medical coverage should be one of the benefits offered by the federal and local governments as an incentive for the accurate reporting of gross income from the registered individual cash based business. The medical coverage provided may work in conjunction with existing programs such as the federal based Medicare program or a local government program like ACCESS in the state of Arizona. The medical coverage would work in a similar manner to current plans where the individual cash based business would have to pay a co-pay for medical service and prescriptions. Again, these fees may be adjustable or on a sliding scale based on different characteristics of the individual cash based business. For example, co-pays could be based on a sliding scale based on national poverty guidelines. Also, doctors could be required to perform pro bono work in order to qualify them to keep their licenses (i.e., perform 20 hours of service to keep a license).

A second benefit offered by the federal and local governments may be free or reduced tuition at higher education institutions. The free or reduced tuition could be at public institutions or private institutions if the private institution is willing to participate in the tax program. The program may even include trade schools if the trade school is willing to participate in the tax program. The amount of reduction in tuition may be based on different factors such as the amount of income from the individual cash based businesses, tax income generated from this program, and the like. The listing of the above are examples of different criteria and should not be seen as to limit the scope of the present invention. The free or reduced tuition could work in conjunction with present government loan programs for schooling. The loans may be cancelled in whole or in part under the tax program.

A third benefit offered by the federal and local governments may be free or reduced rent. The free or reduced rent could be at public housing or private housing if the private housing is willing to participate in the tax program. The amount of reduction in rent may be based on different factors such as the amount of income from the individual cash based businesses, tax income generated from this program, age of the person, and the like. The listing of the above are examples of different criteria and should not be seen as to limit the scope of the present invention.

A fourth benefit offered by the federal and local governments may be a guarantee of retirement income such as social security or the like. In accordance with one embodiment of the present invention, a certain amount of the tax paid by the individual cash based businesses may be set aside and placed in an interest bearing account to be paid to the individual cash based business upon retirement. This will ensure that the individual cash based businesses will receive social security benefits. Alternatively, the individual cash based business may be able to contribute more to a retirement fund like a 401K plan, 403B plan, Keogh plan, IRA, or the like. Other methods may be used to ensure that the individual cash based businesses will receive retirement income upon retirement without departing from the spirit and scope of the present invention.

The federal and local governments may offer one or more of the above benefits. If multiple benefits are offered, the individual cash based businesses may select which benefit it would like to receive. The above system will encourage individual cash based businesses to accurately report their tips/income since benefits received will be sufficient enough so that the registered individual cash based business will want to report their gross income in order to receive the benefits. Plus, at the same time, the penalty or interest assessed will to be stiff enough so that the registered individual cash based business will want to report its their gross income instead of having to be assessed the penalty or interest.

Figure 2:
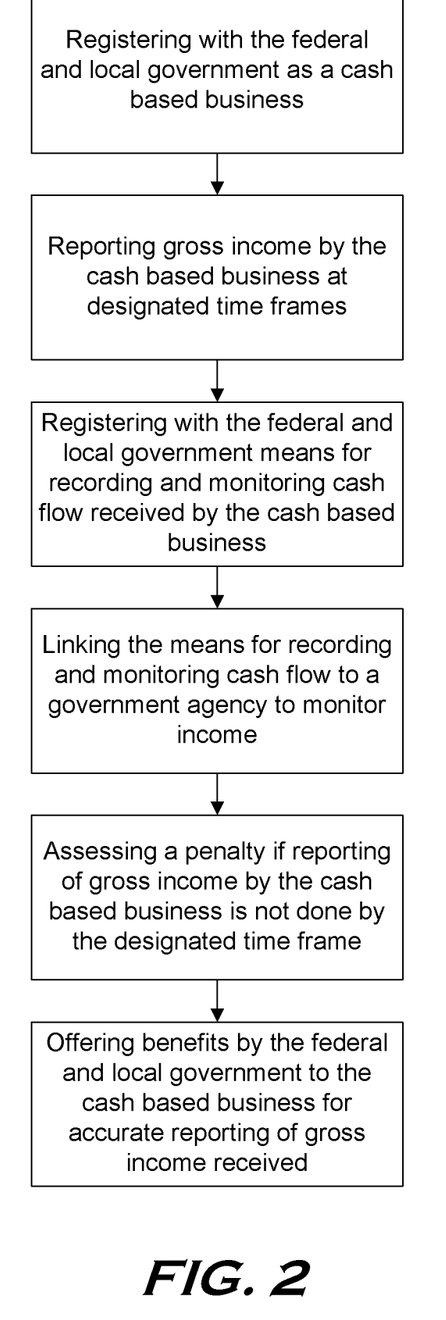
FIG. 2 is a flowchart depicting a method that encourages the reporting of income/tips by employees of cash based businesses.

Referring to FIG. 2, a method that encourages the reporting of income/tips by employees of cash based businesses will be disclosed. The method disclosed in FIG. 2 relates to cash based businesses having multiple employees. The method would apply to cash based businesses such as a retail stores, bakeries, restaurants, taxi cab companies, and the like. The listing is given as an example, and should not be seen as to limit the scope of the present invention.

The method in FIG. 2 is similar to that shown in FIG. 1. The main difference is the way that the gross income will be monitored. Like the method of FIG. 1, the IRS or federal government may still supply the cash based business with a uniform income statement form. Each month, or other designated time frame, the cash based business must fill in the income statement form and return it to the IRS by a designated time frame. However, unlike registered individual cash based businesses which are more difficult to monitor, cash based businesses having multiple employees generally have means for recording and monitoring the cash flow received. For example, retail stores and bakeries generally have cash registers for conducting business. Taxi cabs have meter devices for monitoring the fare for each customer. Each means for recording and monitoring the cash flow received would be registered with the federal government and the local governments. The means for recording and monitoring the cash flow will be periodically checked by government officials to ensure that the devices have not been tampered with.

Additionally, each means for recording and monitoring the cash flow may be linked to the IRS through wired or wireless means in order for the IRS to monitor income from these cash based businesses. The means for recording and monitoring the cash flow may be coupled to existing phone and cables lines or through wireless telecommunication means. The IRS can then monitor the cash flow from each cash based business. Income for individual employees can be based on the time worked and the gross income received by the cash based business. Alternatively or in conjunction with the above, the IRS can estimate an employee's cash tips based on the credit-card tipping rates. If there is a discrepancy greater than a set percentage between the employees' reported income and the IRS estimate, a more thorough audit may be performed.

In order to encourage reporting of gross income from the registered cash based business, the federal and local government will provide certain benefits to the registered cash based business similar to that described above. The benefits provided will be sufficient enough so that the registered cash based business will want to report its gross income in order to receive the benefits. At the same time, the penalty or interest assessed needs to be stiff enough so that the registered individual cash based business will want to report its gross income instead of having to be assessed the penalty or interest. The benefits will include, but are not limited to: 1) medical coverage for the cash based business owner and employees; 2) free or reduced tuition at higher education institutions for the cash based business owner and employees; 3) free or reduced rent for the cash based business owner and employees; and 4) a guarantee of retirement income such as social security or the like for the cash based business owner and employees.

The federal and local governments may offer one or more of the above benefits. If multiple benefits are offered, the cash based business owner and employees may select which benefit they would like to receive. The above system will encourage cash based business owners and employees to accurately report their tips/income since benefits provided will be sufficient enough so that the registered cash based business will want to report their gross income in order to receive the benefits. Plus, at the same time, the penalty or interest assessed will be stiff enough so that the registered cash based business will want to report its gross income instead of having to be assessed the penalty or interest.

Figure 3:
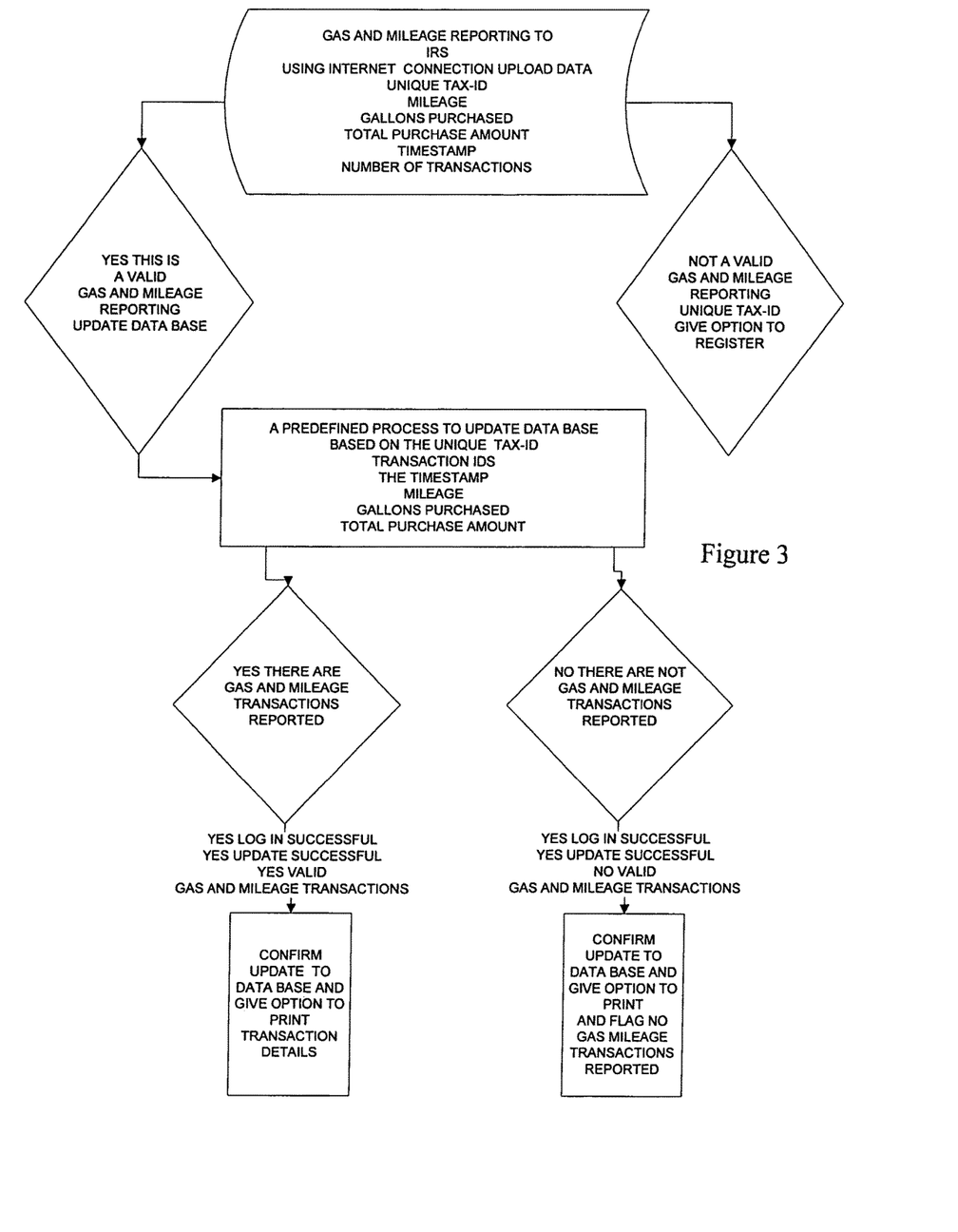
FIG. 3 is a flowchart depicting a method for gas and mileage reporting to the IRS.

Referring to FIG. 3, a flowchart is shown which describes a method for gas and mileage reporting to the IRS. The method may be used for cash businesses like cab/limo drivers, couriers, and the like. The listing of the above is given as an example and should not be seen as to limit the scope of the present invention. The method may be used for any business as a way to report gas and mileage to the IRS. As shown in FIG. 3, the data is sent to the IRS. The data sent to the IRS will include, but is not limited to, tax ID number, mileage, gallons purchased, total purchase amount, time/date (i.e., timestamp), number of transactions, and the like. The listing is only given as an example and should not be seen as to limit the scope of the present invention. After the data has been sent to the IRS, the tax ID number will be validated. If the tax ID number is not a valid number, the person submitting the data may (1) reenter the tax ID number, or (2) be given the opportunity to register for a tax ID number. Once the tax ID number has been verified, the data is uploaded to a database. The data is stored under the tax ID number. If there are previous transactions related to the tax ID number, then the previous data stored in the database is updated with the new data that was just uploaded. If there are no existing transactions stored in the database, then the current data is stored in the database under the corresponding tax ID number. Once the data has been properly stored in the database, the details of the transaction may be printed.

Figure 4:
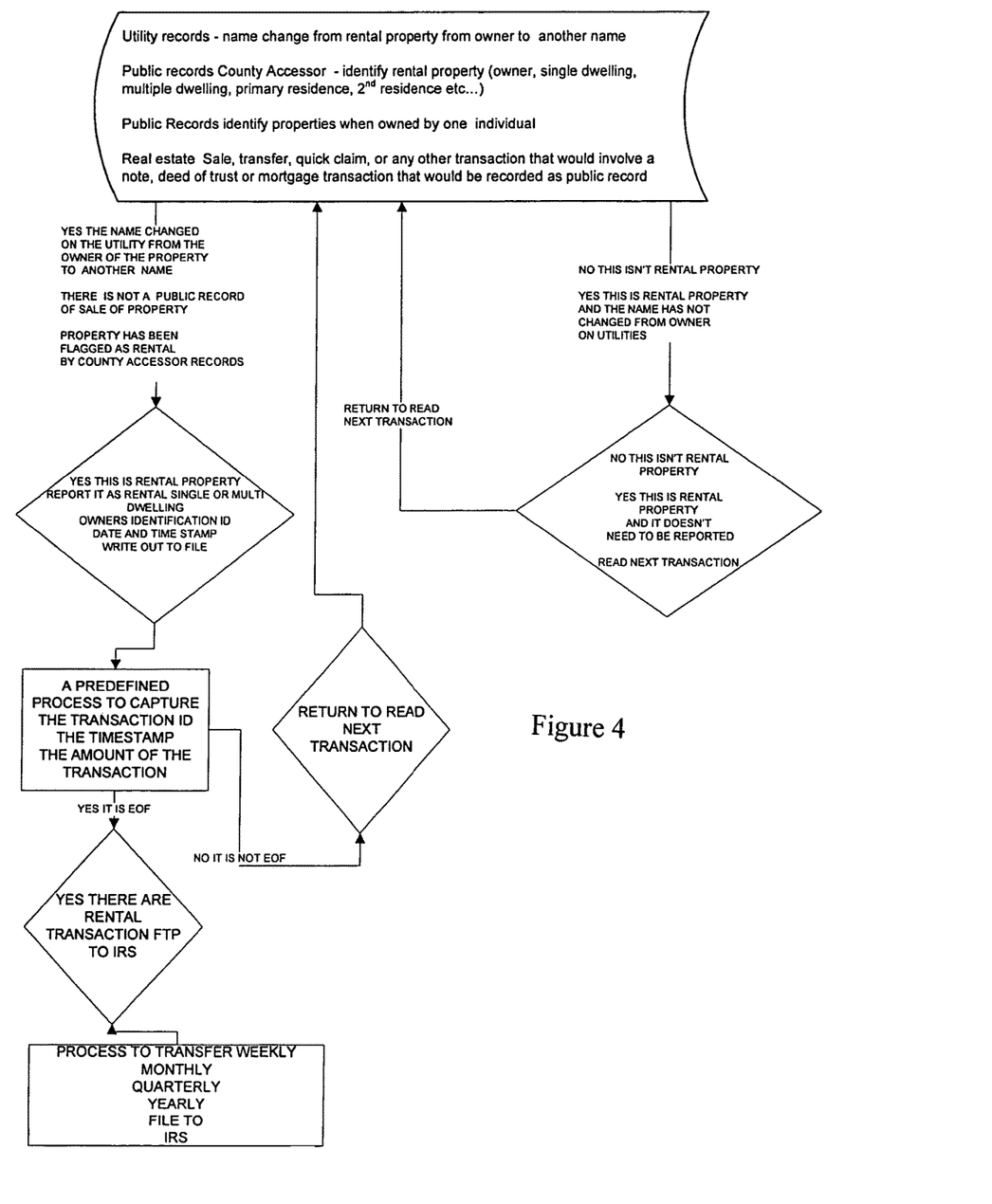
FIG. 4 is a flowchart depicting a method for reporting income from rental property to the IRS.

Referring to FIG. 4, a flowchart is shown which describes a method for reporting income from rental property to the IRS. The method first determines if the property in question is a rental property. Different databases may be searched to determine if a specific property is rental property. For example, utility records may be checked to determine if bills being sent to the rental property have changed name from the owner of the property to another name. Public records at the county assessor's office may be checked to determine classification of the property (i.e., owner, single dwelling, multiple dwelling, primary residence, secondary residence, etc.). Public record databases may further be checked to see real estate sales, transfers, quick claims, or other transactions that would involve a note, deed of trust, mortgage transaction and the like.

After reviewing the above data, a determination can be made as to whether the property in is question is a rental property. If a determination is made that the property in question is not a rental property (i.e., no change in utility records and all databases show the property as a non-rental property), then a next property in question will be reviewed. However, there are properties that may be categorized as a rental properties but that do not need to be reported to the IRS.

If the property is determined to be a rental property (i.e., name changed on the utilities, no public record as to a sale of the property, property flagged as rental property by the county accessor, etc.), data is written to the owner's tax ID number. Data may include, but is not limited to, time/date, amount of the transaction, and the like. A search is conducted to see if other rental transactions for this property and the owner's tax ID number have occurred during the current tax year. If so, the current data is combined with the pre-existing data and sent to the IRS. If not, the new data is stored and sent to the IRS. The transfer of data to the IRS is made at predetermined intervals for the rental property (i.e., weekly, monthly, quarterly, yearly, etc.).

Figure 5:
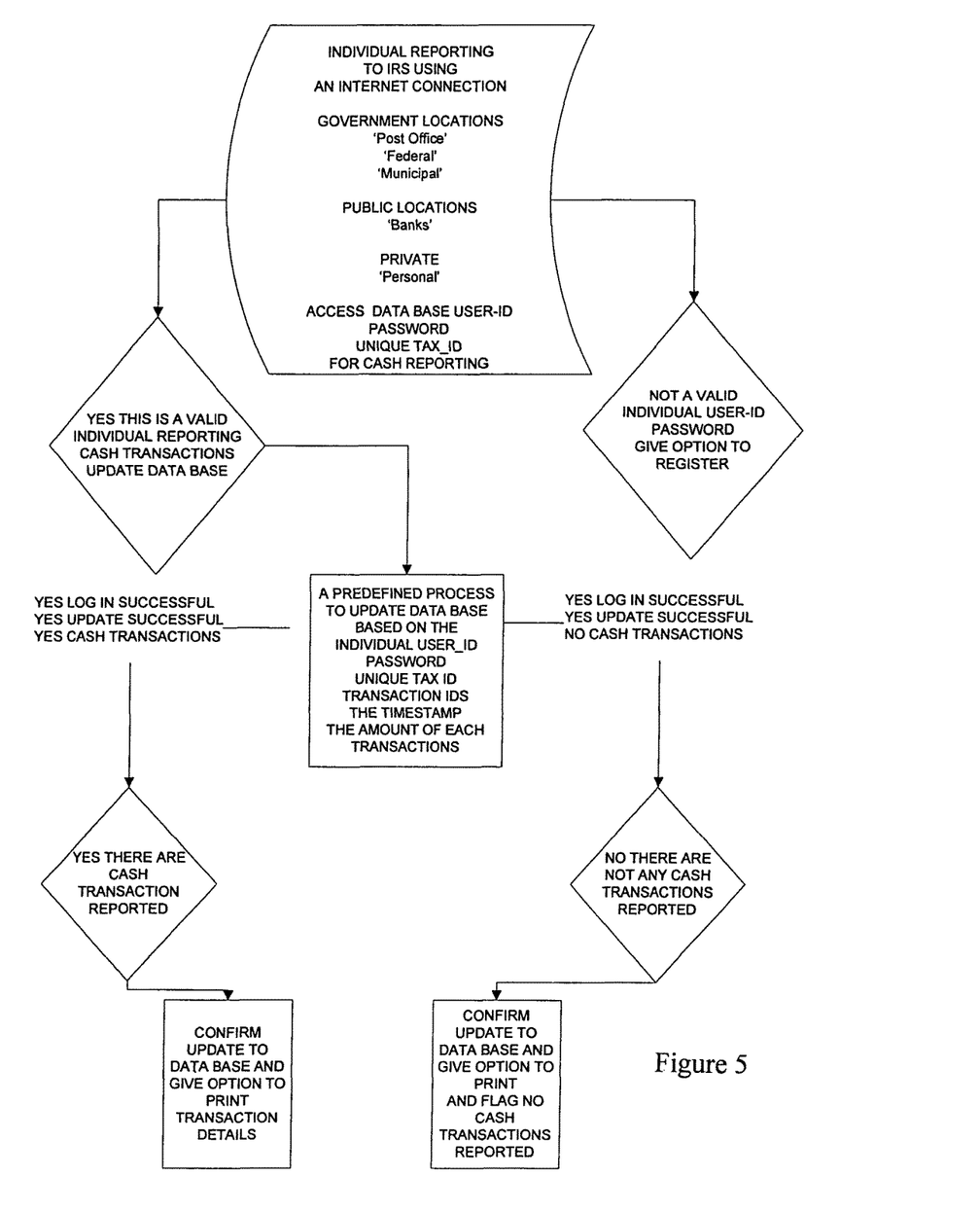
FIG. 5 is a flowchart depicting a method for reporting cash income that uses a computer connection.

Referring to FIG. 5, a flowchart is shown describing a method for reporting cash income that uses a computer connection. The computer may be any computer that will allow a connection to the IRS. This may include, but is not limited to, personal computers, public computers located in government offices like a post office, government building local or federal, and the like. The computer must have a connection to the IRS. The connection may be a wired or wireless connection. The connection may be a direct link to the IRS or one via a portal like an internet provider or the like. Once a computer with access to the IRS is located, the user will access the IRS website. The user will enter a user ID and password. Other information may be entered such as a tax ID number and the like. A determination is then made if a valid user ID/password/tax ID has been entered. If so, the user can enter different cash transactions. Each transaction will be time stamped and uploaded to a database. A user may then print out a copy of the transactions and other details regarding the user's tax ID. If no transactions are to be reported, the user may still be able to print out different details regarding the user's tax ID.

Figure 6:
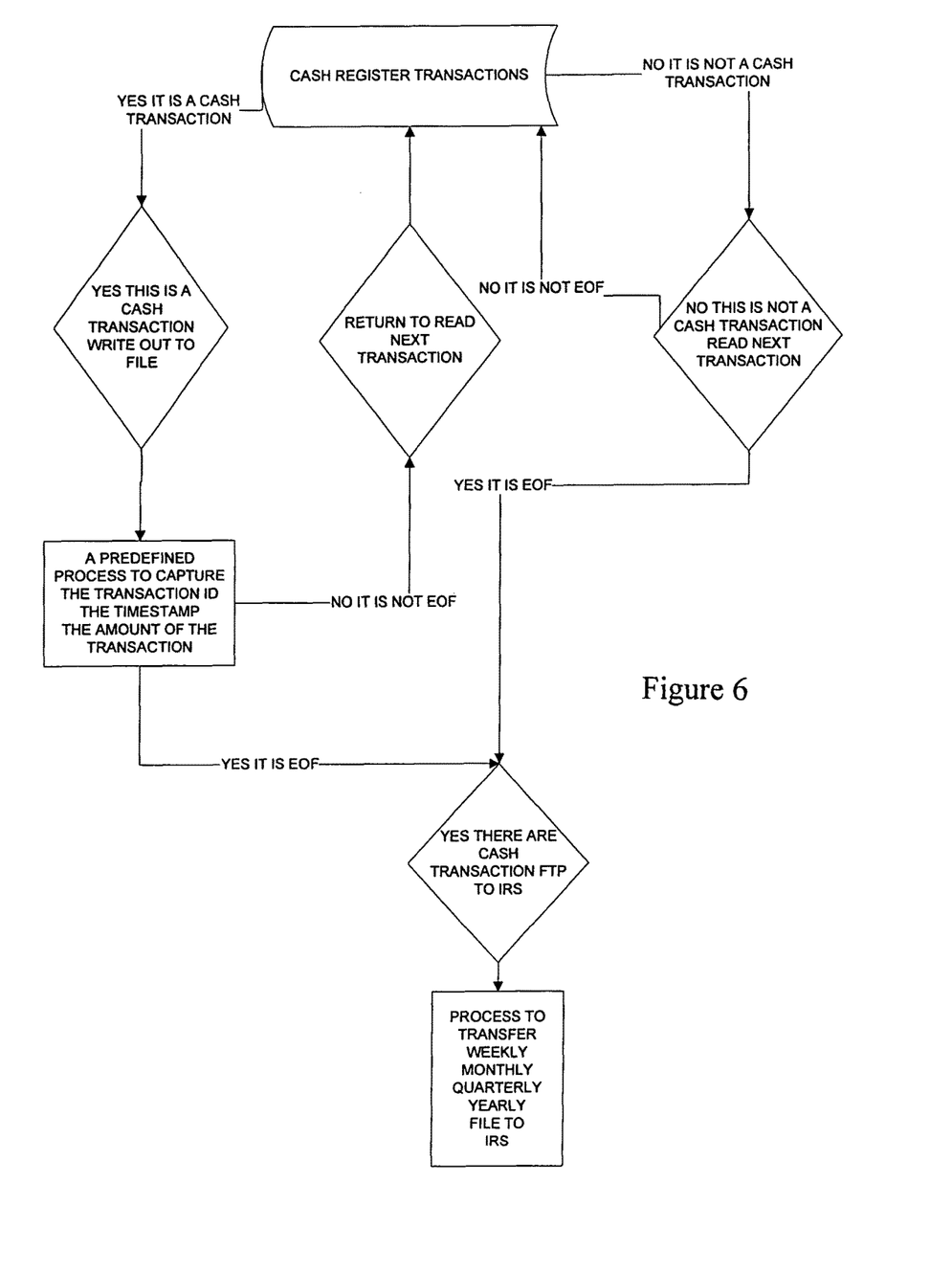
FIG. 6 is a flowchart depicting a method for reporting cash register cash transactions.

Referring to FIG. 6, a flowchart is shown describing a method for reporting cash register transactions. Cash registers for cash based businesses would have to register with the IRS. Each cash register would be connected to the IRS via a wired or wireless connection. During a transaction, the user of the cash register will indicate whether the transaction is a cash transaction or credit card transaction. If the transaction is a cash transaction, the cash register will capture the amount, timestamp, and store the transaction. The cash register will then determine at predefined time periods to send all cash transactions captured and stored to the IRS. The time frame may be daily, weekly, monthly, quarterly, yearly, or the like. If the time frame has not occurred, the cash register will capture, timestamp, and store the transaction and then return to read the next transaction. At the end of the designated time frame, the cash register will transfer the data to the IRS. The data may be sent to the IRS in different manners. The data may be sent via a wired or wireless connection. In accordance with one embodiment, the data is sent to the IRS via an internet connection. For all non-cash transactions, the cash register will return to read the next transaction.

The above methods would benefit both the individual cash based business and the federal and state government. First, the deficit of the federal and local governments can be reduced since more taxable income is being reported. Second, taxes for the general population may be reduced since more taxable income is being reported. Third, the gross income of all Schedule C earners will become a reportable income. Fourth, the process of applying for a loan, equity line of credit, or buying a house becomes easier; the lending institution would prequalify the individuals instantly. Fifth, the income statements provided by the taxpayers (with the taxpayers' permission) would be available and accessible within minutes by the taxpayer. Sixth, this information would also be available to the court systems; this information could be used by judges in divorce, bankruptcy, and other legal proceedings.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process, may be implemented by one of skill in the art in view of this disclosure.

What is claimed is:

1. A computerized system for encouraging a user to report data to a tax collecting agency, the system comprising:
   a computerized network system comprising at least one user taxi cab meter, at least one tax collecting entity computer, and a verification computer;
   wherein, the at least one user taxi cab meter is configured to prompt the user to enter an identification number into the at least one user taxi cab meter;
   and wherein, the at least one user taxi cab meter is configured to receive the identification number input by the user and transmit the identification number input by the user via the network connection to the verification computer;
   and wherein, the at least one user taxi cab meter is configured to prompt the user to enter gross income received by the user, and further configured to prompt the user to enter vehicle usage data relating to a vehicle, display the vehicle usage data to the user, and confirm the vehicle usage data, and transmit the gross income received and vehicle usage data to the at least one tax collecting entity computer;
   and wherein the at least one tax collecting entity computer is configured to receive from the at least one user taxi cab meter via the computer network system the vehicle usage data input by the user and further configured to provide a calculated estimate of gross income based on the-vehicle usage data;
   and wherein the system is further configured to derive a difference between the gross income the calculated estimate of gross income;
   entering, by the user, vehicle usage data relating to a vehicle into the at least one user taxi cab meter;
   entering into the at least one user taxi cab meter, by the user, gross income received relating to the vehicle:
   calculating, by the at least one tax collecting agency computer, an estimated amount of income; and
   transmitting the vehicle usage data to the at least one tax collecting entity computer.

2. The computerized system of claim 1 wherein the computerized system comprising at least one user taxicab meter is further configured to provide to the user a benefit when the difference is less than a preselected amount.

3. The computerized system of claim 2 wherein the benefit comprises medical coverage.

4. The computerized system of claim 2 wherein the benefit comprises retirement income.

5. A computerized method enabling a user to report vehicle usage data to a tax collecting agency, the method comprising: providing the user with at least one user taxi cab meter; providing the tax collecting agency with at least one agency computer; providing a verification computer; prompting a the user to enter an identification number into the at least one user taxi cab meter; receiving, by the at least one user taxi cab meter, the identification number input by the user; verifying the identification number, by the verification computer, by comparing the identification number against a list of known valid identification numbers; entering, by the user, vehicle usage data relating to a vehicle into the at least one user taxi cab meter; entering into the at least one user taxi cab meter by the user, gross income received relating to the vehicle; calculating, by the at least one tax collecting agency computer, an estimated amount of income; and transmitting the vehicle usage data to the at least one tax collecting entity computer.

6. The computerized system of claim 5, wherein the vehicle usage data comprises a mileage of the vehicle.

7. The computerized method of claim 5, wherein the vehicle usage data comprises an amount of tips with respect to the vehicle.

8. The computerized system of claim 5, wherein the vehicle usage data comprises a time and a date of use of the vehicle.

9. The computerized system of claim 5, further comprising determining the accuracy of the amount of tips with respect to the vehicle by comparing the amount of tips to the reasonable estimated amount of tips transmitted to the one or more tax collecting entity computers.

* * * * *